United States Patent [19]
Lockyer et al.

[11] Patent Number: 5,115,449
[45] Date of Patent: May 19, 1992

[54] DATA NETWORKS

[76] Inventors: Terence D. Lockyer, 10 Avebury Avenue, Luton, Bedfordshire LU2 7DT; Martin C. Adams, 2 Mill Cottages, Station Road, Much Hadham, Hertfordshire SG10 6AU, both of England

[21] Appl. No.: 525,721

[22] Filed: May 21, 1990

[30] Foreign Application Priority Data

May 25, 1989 [GB] United Kingdom ............. 8912090.1

[51] Int. Cl.$^5$ .............................................. H04B 1/74
[52] U.S. Cl. ........................................ 375/3; 371/8.2; 375/7; 375/40; 455/8
[58] Field of Search ...................... 375/7, 40, 100, 3, 4; 370/16; 455/8, 9, 10, 14, 52, 59; 371/8.1, 8.2, 68.1; 340/825.01

[56] References Cited

U.S. PATENT DOCUMENTS

| | | | |
|---|---|---|---|
| 4,030,069 | 6/1977 | Hendrickson et al. | 455/8 |
| 4,692,918 | 9/1987 | Elliott et al. | 370/16 |
| 4,837,760 | 6/1989 | Reid et al. | 370/16 |

FOREIGN PATENT DOCUMENTS 2012526A 7/1979 United Kingdom .

OTHER PUBLICATIONS

Chipcom Corporation, "Fault-Tolerant ORnet (Fiber) Transceiver", 4 pages, Apr. 1990.

Primary Examiner—Benedict V. Safourek
Attorney, Agent, or Firm—Oliff & Berridge

[57] ABSTRACT

A LAN or other data network includes at least first and second repeater units for receiving data signals and repeating them to other parts of the data network and a transceiver unit for transmitting and receiving data which is connected to the first repeater unit by a primary data link and to the second repeater unit by a secondary data link. The primary data link comprises a primary transmit line for transmitting data from the transceiver unit to the first repeater unit and a primary receive line for receiving data from the first repeater unit and transmitting it to the transceiver unit; and the secondary data link comprising a secondary transmit line for transmitting data to the second repeater unit and a secondary receive line for receiving data from the second repeater unit and transmitting it to the transceiver unit. Intelligent monitoring means determines whether or not the transceiver unit is transmitting data and also whether or not data signals are present on each of the primary receive line and the secondary receive line and accordingly controls a switch unit to switch between two states in which either the primary transmit and receive lines or the secondary transmit and receive lines, but not both, are in communication with the transceiver unit. Both transmit and receive faults can be detected and appropriate action to avoid them taken.

11 Claims, 5 Drawing Sheets

DATA NETWORKS

The invention relates to data networks and relates primarily, but not exclusively, to local area data networks.

The successful transmission of data in a local area network is dependent on the existence of a data transfer path between the sending and receiving stations. In a large local area network the path between the sending and receiving station may consist of a large number of links constituted by a variety of active or passive network components. It is apparent that any one of these interlinking components may fail, and consequently disrupt data transmission between the sending and receiving station.

The present invention provides a data network in which failures can be identified and in which an alternative route for data traffic will be automatically provided Accordingly there is provided a data network including at least first and second repeater units for receiving data signals and repeating them to other parts of the data network;

a transceiver unit for transmitting and receiving data;

a primary data link comprising a primary transmit line for transmitting data from the transceiver unit to the first repeater unit and a primary receive line for receiving data from the first repeater unit and transmitting it to the transceiver unit;

a secondary data link comprising a secondary transmit line for transmitting data from the transceiver unit to the second repeater unit and a secondary receive line for receiving data from the second repeater unit and transmitting it to the transceiver unit; and intelligent monitoring means for determining whether or not the transceiver unit is transmitting data and also whether or not data signals are present on each of the primary receive line and the secondary receive line;

and a switch unit actuated by signals from the said monitoring means to switch between two states in which either the primary transmit and receive lines or the secondary transmit and receive lines, but not both, are in communication with the transceiver unit.

It should be noted that the transceiver referred to may itself be a repeater unit.

The invention therefore provides a primary data link between the transceiver unit and the first repeater unit, and a secondary data link between the transceiver unit and the second repeater unit, the monitoring means being capable of switching between the two alternative data links but always keeping one link open.

When the transceiver unit is not transmitting but receiving data in normal operation of the data network, the data should normally be received from both the first and second repeater units and thus appear on both the primary and secondary receive lines. If data is present on one line but not on the other, it is reasonable to assume that there is a fault affecting the data link of which the receive line having no data on it forms part, or the repeater to which that link is connected. Preferably therefore, the monitoring means is programmed to detect a first condition in which the transceiver unit is not transmitting data and there is data present on only one of the primary and secondary receive lines and to respond to that first condition by actuating exclusively the data link including the receive line on which data was present when the said first condition was detected.

The monitoring means should only actuate the switch unit if the first condition has been continuously detected for a predetermined time period. In this way should a data signal appear on one receive line before it appears on the other, due to normal operating delays within the data network, a fault condition is not diagnosed in error.

When the transceiver unit is transmitting to one repeater unit, the transmitted signal should eventually reappear on the receive line from the other repeater unit. Failure to re-appear may be due to a fault in the data link associated with the transmitting of data to the one repeater unit, or the data link associated with the receiving of data from the other repeater unit or to other faults, e.g. in a data link between the two repeaters. Once one of the receive lines is seen to be operational, by the presence of data on it when the transceiver unit is no longer itself transmitting, it is reasonable to work on the basis that the fault is associated with the transmit line. Preferably therefore the monitoring means is also programmed to detect a second condition, namely when a first observation shows that the transceiver unit is transmitting data on the transmit line of the either the primary or the secondary data link and there is no data on the receive line of the other data link, and then a second observation, within a predetermined time period from the first observation, shows that there is data on the said other receive line when the transceiver is not transmitting data and to respond to that second condition by actuating the switch unit, if necessary, to bring the transceiver unit into communication with the data link including the receive line on which data was observed in the second said observation but not in the first.

The monitoring means should only respond to the second condition if in the first observation the absence of data from the relevant receive link has been continuously detected for a predetermined time period. This avoids the spurious diagnosis of a fault before the transmitted data signal has had time to pass around the data network and re-appear at the receive line from the other repeater unit.

It will be seen that receive line faults are detected because they give rise to the first condition, and transmit line faults because they give rise to the second condition.

Whether the fault is diagnosed as being associated with the transmit or receive lines, the monitoring means preferably also sends a signal to actuate an error indicator in a network manager or elsewhere.

Additionally or alternatively, there is conveniently provided means for resetting the switch unit to its original state after a predetermined period of time has elapsed following the detection of the first or second condition. This causes the intelligent monitoring means to re-check the line that was diagnosed faulty and prevents a temporary fault which is self correcting or a fault in the network beyond the first and second repeaters from causing the processing unit to select exclusively for a indefinite period either the primary or secondary data links.

Preferably the monitoring means is also programmed to detect a third condition, namely when the transceiver unit is transmitting data on the transmit line of its primary or secondary data links and there is data on the receive line of its other data link and to actuate the switch unit when the said third condition ceases to change the data link to which the transceiver is connected. In this way, when no fault has been diagnosed, the monitoring means switches between the primary and secondary data links after each transmission by the transceiver unit. Alternatively or additionally, the monitoring means switches between the primary and secondary lines after a predetermined interval, provided that the transceiver unit is neither transmitting nor receiving. In either case, the transceiver unit thereby transmits alternately over the primary and secondary lines, which are therefore regularly monitored, and there are advantages over systems in which a back-up line is only bought into operation in the event of a fault and in which problems in the back-up line may remain undetected until the very time that the back-up line is needed.

To gain maximum benefit from the invention, the first and second repeater units should be wholly independent of one another, but some advantage can be obtained even if they are separate channels in a single multiport repeater.

It is considered an advantage of the invention that the monitoring means and switching unit may be located together adjacent to or inside the transceiver that they serve; but it is possible in principle to locate the switching unit and optionally part of the monitoring means at the opposite end of the data links, or at some intermediate point, provided reliable communication of monitoring signals can be ensured.

The present invention also extends to a method of operating a data network including a transceiver unit for transmitting and receiving data, and at least first and second repeater units for receiving data signals from that transceiver unit and repeating them to other parts of the data network, the method comprising the steps of providing a primary data link comprising a primary transmit line for transmitting data from the transceiver unit to the first repeater unit and a primary receive line for receiving data from the first repeater unit and transmitting it to the transceiver unit; providing a secondary data link comprising a secondary transmit line for transmit data from the transceiver unit to the second repeater unit and a secondary receive line for receiving data from the second repeater unit and transmitting it to the transceiver unit; determining whether or not the transceiver unit is transmitting data; determining the presence or absence of data signals on the primary receive line and the secondary receive line; and switching between two states in which respectively the primary data link and the secondary data link is in communication with the transceiver unit, depending on whether the transceiver unit is transmitting data and whether there are data signals on the primary receive line and the secondary receive line.

The invention will now be further described, by way of example only, with reference to the accompanying drawings, in which.

Figure 1:
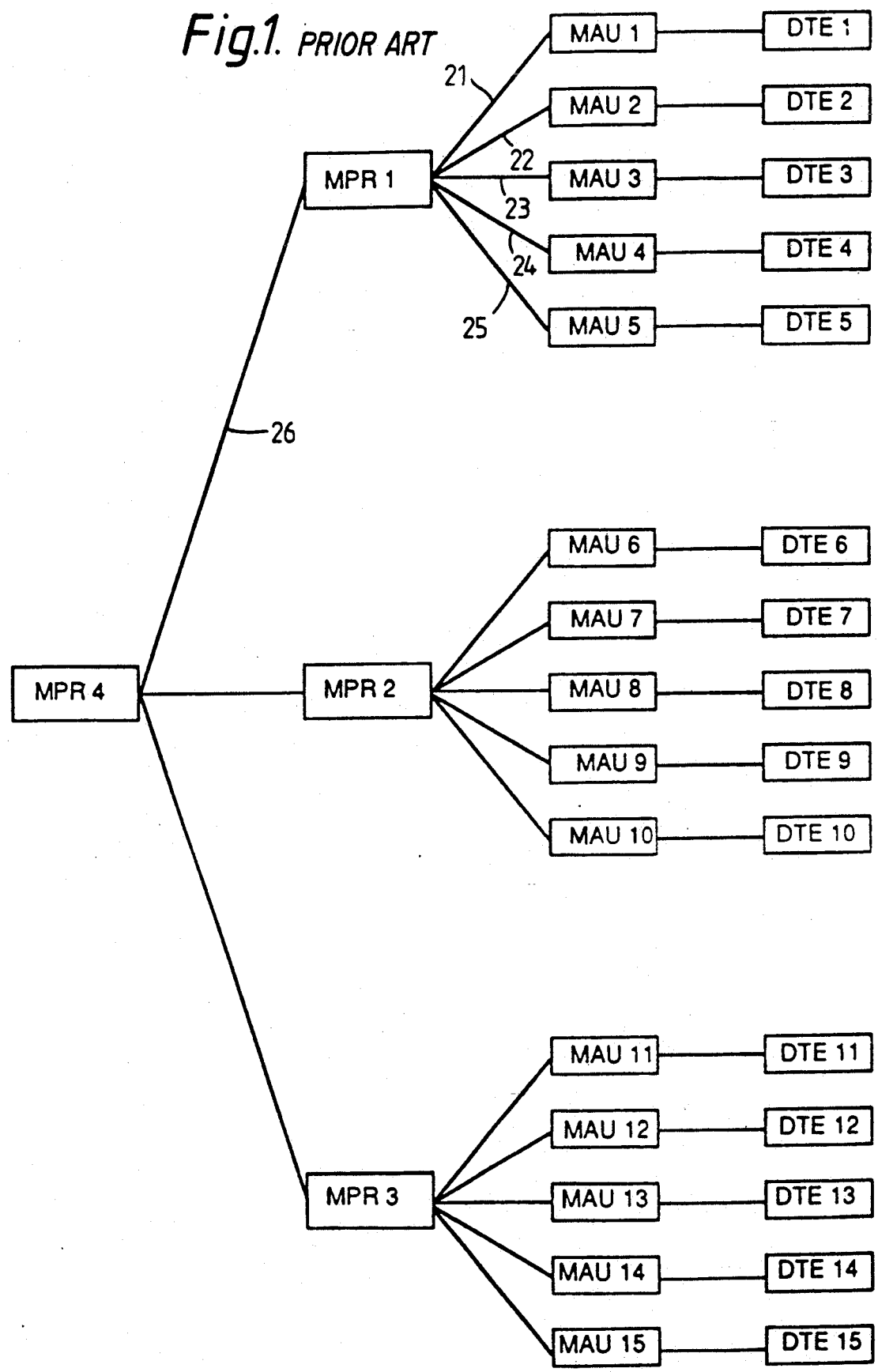
FIG. 1 is a schematic diagram of a conventional data network.

Referring to FIG. 1, a data network employing a CSMA/CD (carrier sense multiple access with collision detection) access method comprises a number of pieces of data terminal equipment, such as computers etc, illustrated in FIG. 1 as DTE's 1 to 15. Each DTE has access to the data network via a media access unit, illustrated as MAU's 1 to 15 respectively. Each group of MAU's is associated with a multiport repeater (MPR), MAU's 1 to 5 with MPR 1, MAU's 6 to 10 with MPR 2 and MAU's 11 to 15 with MPR 3. MPR's 1 to 3 are themselves interlinked via MPR 4, and it will be seen that the network could be further extended in any conventional or convenient way.

The operation of the network of FIG. 1 will now be briefly described. Data from DTE 1 is passed to MPR 1 via MAU 1 and via bidirectional data link 21, and the multiport repeater is designed to repeat the data signals to each of MAU's 2 to 5 via bidirectional data links 22-25. Additionally MPR 1 sends the data via a further bidirectional data link 26 to MPR 4, which itself repeats the data to MPR's 2 and 3, and onwards to each of MAU's 6 to 15 by corresponding data links. In this way information transmitted by DTE 1 is repeated to every other DTE in the network. The network will operate similarly with data from any of the DTE's.

It will be seen from FIG. 1 that data from any of DTE's 1 to 5 destined for any of DTE's 6 to 15 must pass through MPR 4. Consequently a failure in MPR 4, or in the data links connecting it with other MPR's will have a particularly disruptive effect on the data network.

Figure 2:
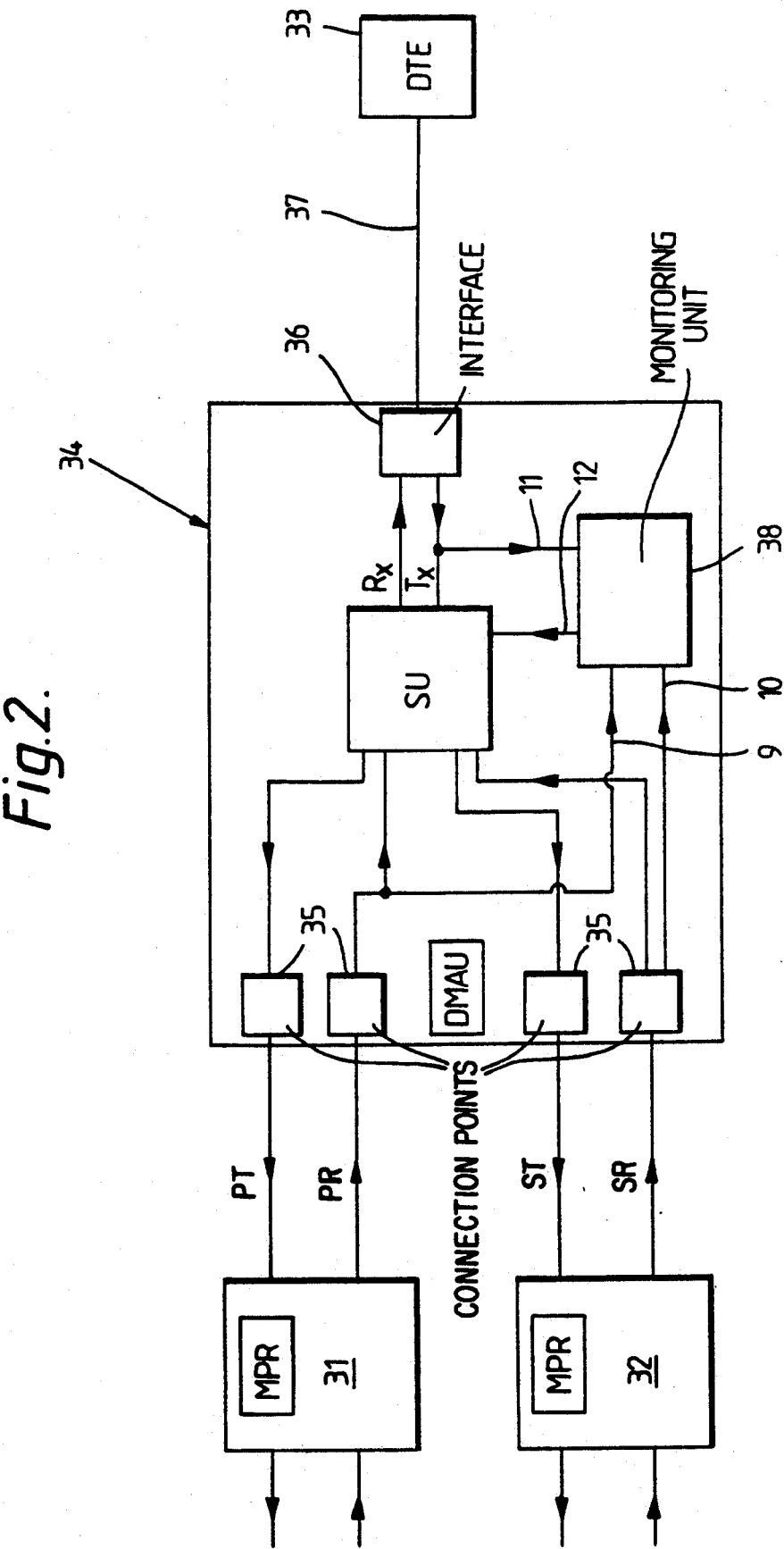
FIG. 2 is a schematic diagram of a part of a data network according to the present invention.

FIG. 2 shows first and second MPR's 31 and 32 both connected to a DTE 33 by intelligent processing unit 34 in the form of a modified MAU, hereinafter referred to as a dual MAU or DMAU. The DMAU 34 is connected to MPR 31 by a biderectional data link (the primary data link) made up of primary transmit line PT and primary receive line PR; it is also connected to MPR 32 by another bidirectional data link (the secondary data link) made up of transmit line ST and secondary receive line SR. These transmit and receive lines are preferably optical fibre links or twisted pair electrical cable, but other links (including optical links in free space or coaxial cable) could be used if desired. Appropriate connection points 35 for PT, PR, ST and SR are provided within the DMAU.

Also within the DMAU 34 is an electronic switch unit SU which always connects either the two primary lines PT and PR or the two secondary lines ST and SR to the corresponding one of receive line R and transmit line T which are connected via interface unit 36 and bidirectional data link 37 to the DTE 33. Alternatively DMAU 34 could be incorporated within the DTE. The DMAU 4 also comprises a monitoring unit 38 which receives data signals from receive lines PR and SR on lines 9 and 10 respectively and from transmit line T on line 11.

Figure 3:
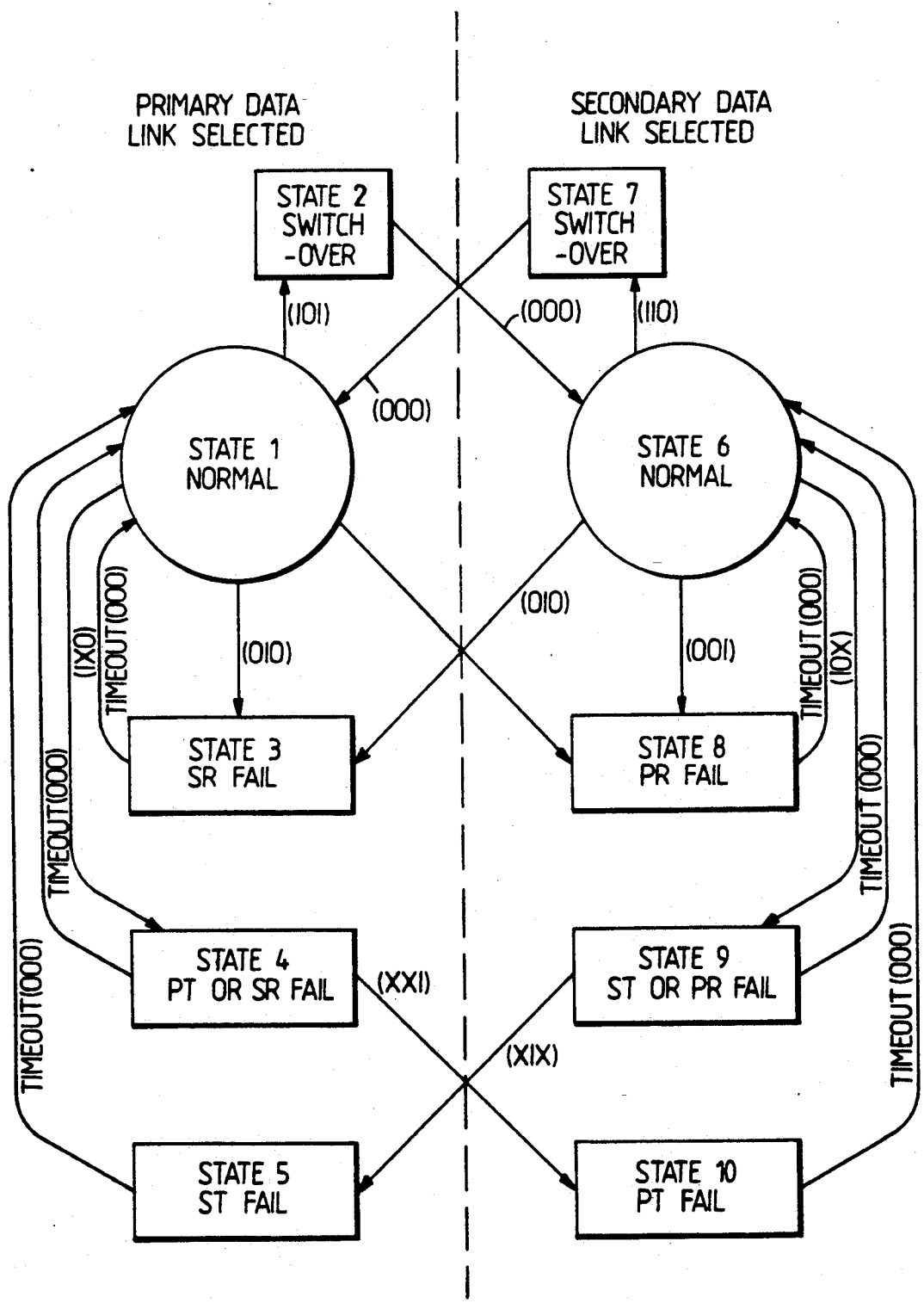
FIG. 3 is a flow diagram illustrating the decision logic of the part of the data network of FIG. 2.

The monitoring unit 38 determines the presence or absence of data signals on lines PR, SR and T by means of their appearance or otherwise on lines 9, 10 and 11. Depending on the combination of signals detected by the monitoring unit 5, signals may be sent via line 12 to the switch unit 5U to switch between a primary connection in which PT and PR are connected to T and R respectively, and a secondary connection in which ST and SR are connected to T and R respectively. The logic operated by the monitoring unit is illustrated in FIG. 3 and set out in the following table, in which the three "condition" columns represent the presence or absence of data on lines T, PR and SR respectively according to the convention 1 = at some time during the expected time period of a transmission, data has been present 0 = throughout the expected time period of a transmission data has been absent X = logic is independent of the presence of absence of a signal on this line in this state.

By the "expected time period" is meant the length of time from the begining of a transmission to the end of its reception back at its point of origin by the slowest route: this period is charateristic of the network, and can be taken as 2 milliseconds for a single network operating Ethernet protocol.

TABLE

| Condition T PR SR | Representing | Transition |
|---|---|---|
| State 1 - normal operation on primary data link | | |
| 1 0 1 | normal transmission | to state 2 |
| 0 0 1 | primary receive fault | to state 8, switch to secondary |
| 0 1 0 | secondary receive fault | to state 3 |
| 1 X 0 | fault on PT or SR | to state 4 |
| Any other | normal operation | none |
| State 2 - normal switchover to secondary | | |
| 0 0 0 | transmission ended | to state 6, switch to secondary |
| Any other | still transmitting | none |
| State 3 - secondary receive fault, operation on primary data link | | |
| 0 0 0 on or after timeout | | to state 1 to retest |
| State 4 - primary transmit or secondary receive fault | | |
| X X 1 | secondary receive OK | to state 10, switch to secondary |
| 0 0 0 on or after timeout | | to state 1, to retest |
| State 5 - secondary transmit fault, operation on primary data link | | |
| 0 0 0 on or after timeout | | to state 1 to retest |
| State 6 - normal operation on secondary data link | | |
| 1 1 0 | normal transmission | to state 7 |
| 0 1 0 | secondary receive fault | to state 3, switch to primary |
| 0 0 1 | primary receive fault | to state 8 |
| 1 0 X | fault on ST or PR | to state 9 |
| Any other | normal operation | none |
| State 7 - normal switchover to primary | | |
| 0 0 0 | transmission ende | to state 1, switch to primary |
| Any other | still transmitting | none |
| State 8 - primary receive fault, operation on secondary data link | | |
| 0 0 0 on or after timeout | | to state 6 to retest |
| State 9 - secondary transmit or primary receive fault | | |
| X 1 X | primary receive OK | to state 5, switch to primary |
| 0 0 0 on or after timeout | | to state 6 to retest |
| State 10 - primary transmit fault, operation on secondary data link | | |
| 0 0 0 on or after timeout | | to state 6 to retest |

In the table, "timeout" indicates the passing of an arbitrary time period since entry into the state concerned; a timeout period of 60 seconds is considered suitable.

It will be appreciated that as an alternative to monitoring data on line T, the lines PT and ST could be input to the monitoring means in order to establish whether DTE 3 is transmitting data onto the network.

Figure 4:
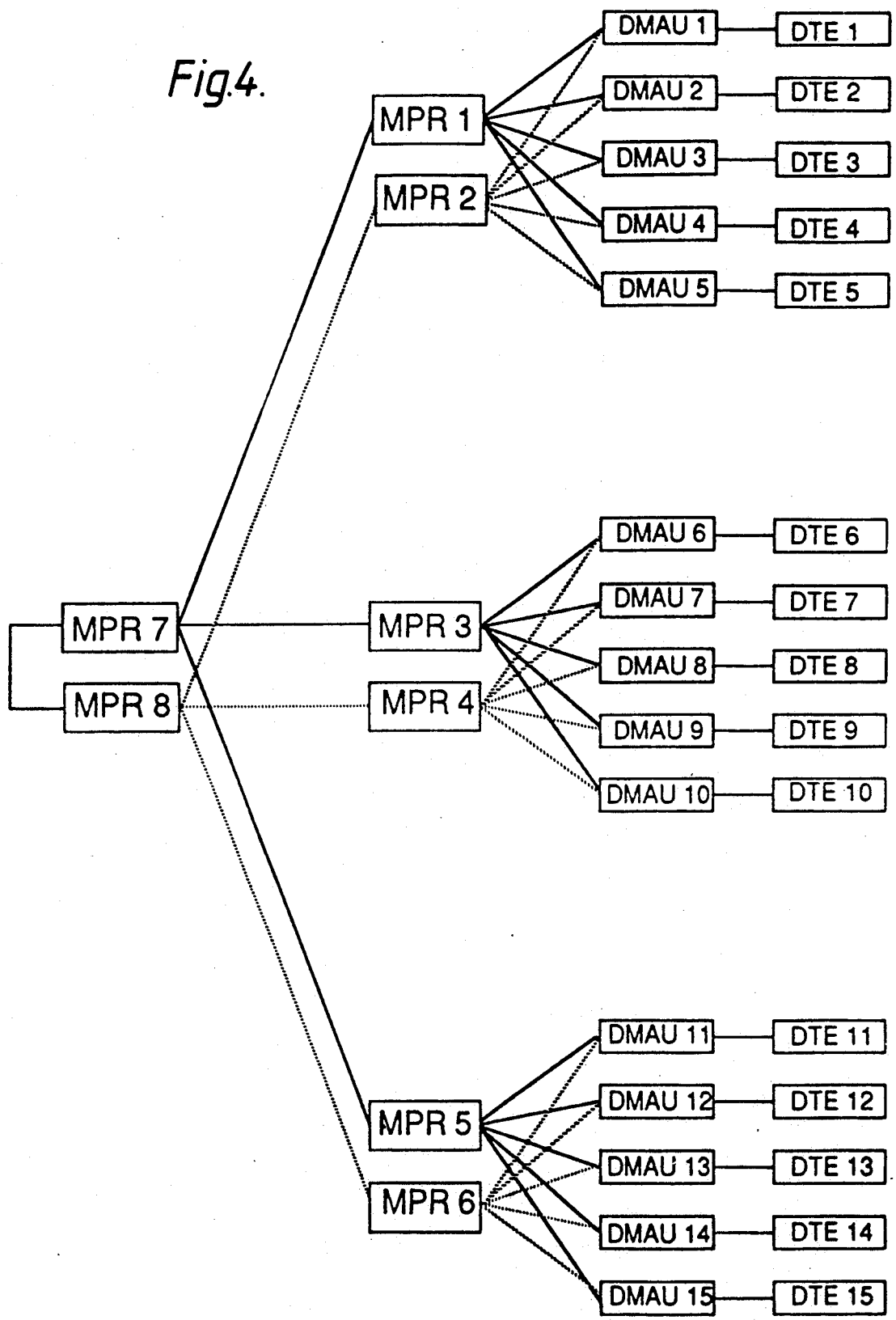
FIG. 4 is a schematic diagram of a data network incorporating the apparatus illustrated in FIG. 2.
Figure 5:
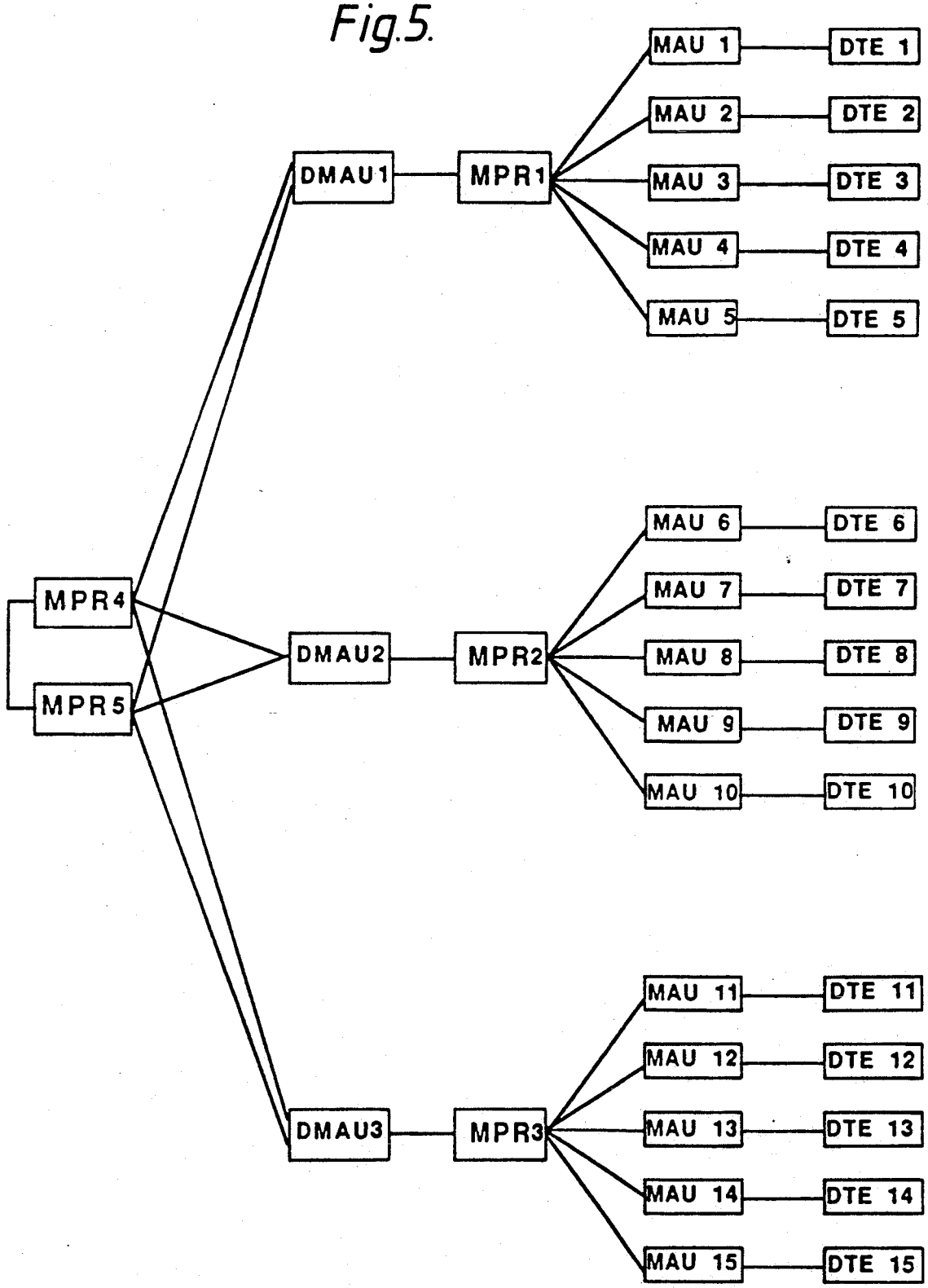
FIG. 5 is a schematic diagram of an alternative layout of data network incorporating the apparatus of FIG. 2.

FIGS. 4 and 5 show two alternative ways in which the DMAU 34 of FIG. 2 can be used in a data network. In FIG. 4 a DMAU is placed between each DTE and two multiport repeaters. In this way a failure of an MPR, or any of the bidirectional links between the DMAU's and the MPR's, will cause a switchover to an alternative MPR and maintain each of the DTE's in communication one with another. FIG. 5 shows a less sophisticated arrangement in which the DMAU's are placed between one level of MPR's in the network and another. This will provide alternative data routes in the event of a failure of any of the MPR's or the links between them, and if a fault does occur in an area of the network unprotected by DMAU's, only a single DTE or at worst the DTE's connected to a single MPR will be out of communication.

What we claim our invention is:

1. A data network including
    at least first and second repeater units for receiving data signals and repeating them to other parts of the data network;
    a transceiver unit for transmitting and receiving data;
    a primary data link comprising a primary transmit line for transmitting data from said transceiver unit to said first repeater unit and a primary receive line for receiving data from said first repeater unit and transmitting it to said transceiver unit;
    a secondary data link comprising a secondary transmit line for transmitting data from said transceiver unit to said second repeater unit and a secondary receive line for receiving data from said second repeater unit and transmitting it to said transceiver unit;
    and intelligent monitoring means for determining whether or not said transceiver unit is transmitting data and also whether or not data signals are present on each of the primary receive line and said secondary receive line;
    and a switch unit actuated by signals from said monitoring means to switch between two states in which either said primary transmit and receive lines or said secondary transmit and receive lines, but not both, are in communication with the transceiver unit.

2. A data network as claimed in claim 1 in which said monitoring means is programmed to detect a first condition in which said transceiver unit is not transmitting data and there is data present on only one of the said primary and secondary receive lines and to respond to that first condition by actuating exclusively the said data link including the said receive line on which data was present when the said firs condition was detected.

3. A data network as claimed in claim 1 which the monitoring means is programmed to detect a second condition, namely when a first observation shows that said transceiver unit is transmitting data on the transmit line of either said primary or said secondary data link and there is no data on said receive line of the other said data link, and then a second observation, within a predetermined time period from said first observation, shows that there is data on the said other receive line when said transceiver is not transmitting data and to respond to that second condition by actuation said switch unit, if necessary, to bring said transceiver unit into communication with the said data link including the said receive line on which data was observed in the second said observation but not in the first said observation.

4. A data network as claimed in claim 2 in which said monitoring means on detecting said first condition also sends a signal to actuate an error indicator.

5. A data network as claimed in claim 3 in which said monitoring means on detecting the said second condition also sends a signal to actuate an error indicator.

6. A data network as claimed in claim 2 including means for resetting said switch unit after a predetermined period of time has elapsed following the detection of said first condition.

7. A data network as claimed in claim 3 including means for resetting said switch unit after a predetermined period of time has elapsed following the detection of said second condition.

8. A data network as claimed in claim 1 in which said monitoring means is programmed to detect a third condition, namely when said transceiver unit is transmitting data on the transmit line of its said primary or secondary data links and there is data on said receive line of its other said data link and to actuate the switch unit to reverse it when the said third condition ceases.

9. A data network as claimed in claim 2 in which said monitoring means switches between said primary and secondary data links after a predetermined interval from the detection of the said first condition, provided that said transceiver unit is neither transmitting nor receiving.

10. A data network as claimed in claim 3 which said monitoring means switches between said primary and secondary data links after a predetermined interval from the detection of said second condition, provided that said transceiver unit is neither transmitting nor receiving.

11. A method of operating a data network including a transceiver unit for transmitting and receiving data, and at least first and second repeater units for receiving data signals from that transceiver unit and repeating them to other parts of the data network, the method comprising that steps of providing a primary data link comprising a primary transmit line for transmitting data from the transceiver unit to the first repeater unit and a primary receive line for receiving data from the first repeater unit and transmitting it to the transceiver unit; providing a secondary data link comprising a secondary transmit line for transmit data from the transceiver unit to the second repeater unit and a secondary receive line for receiving data from the second repeater unit and transmitting it to the transceiver unit; determining whether or not the transceiver unit is transmitting data; determining the presence or absence of data signals on the primary receive line and the secondary receive line;and switching between two states in which respectively the primary data link and the secondary data link is in communication with the transceiver unit, depending on whether the transceiver unit is transmitting data and whether there are data signals on the primary receive line and the secondary receive line.

* * * * *